United States Patent
Pflueger et al.

(10) Patent No.: US 9,409,104 B2
(45) Date of Patent: Aug. 9, 2016

(54) FILTER ELEMENT AND SUPPORT BODY FOR SUCH A FILTER ELEMENT

(71) Applicant: MANN+HUMMEL GMBH, Ludwigsburg (DE)

(72) Inventors: Frank Pflueger, Sachsenheim (DE); Yashwant Udachan, Stuttgart (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 0 days.

(21) Appl. No.: 13/785,953

(22) Filed: Mar. 5, 2013

(65) Prior Publication Data

US 2014/0083927 A1    Mar. 27, 2014

Related U.S. Application Data

(63) Continuation of application No. 12/725,729, filed on Mar. 17, 2010, now abandoned.

(30) Foreign Application Priority Data

Mar. 18, 2009 (DE) ..................... 20 2009 003 704 U

(51) Int. Cl.
  *B01D 29/00* (2006.01)
  *B01D 29/21* (2006.01)
  *B01D 29/92* (2006.01)
  *B01D 29/19* (2006.01)

(52) U.S. Cl.
  CPC ............ *B01D 29/0002* (2013.01); *B01D 29/19* (2013.01); *B01D 29/21* (2013.01); *B01D 29/925* (2013.01); *B01D 2201/0415* (2013.01); *B01D 2201/403* (2013.01)

(58) Field of Classification Search
  None
  See application file for complete search history.

(56) References Cited

U.S. PATENT DOCUMENTS

| | | | | |
|---|---|---|---|---|
| 4,575,422 A | * | 3/1986 | Zimmer | 210/130 |
| 4,714,546 A | * | 12/1987 | Solomon et al. | 210/137 |
| 2005/0263451 A1 | * | 12/2005 | Kramer | 210/450 |

* cited by examiner

*Primary Examiner* — Benjamin Kurtz
(74) *Attorney, Agent, or Firm* — James Hasselbeck

(57) ABSTRACT

A filter element for purifying a fluid at risk of freezing such as a urea-water solution for exhaust gas after treatment has an annular filter body and a support body surrounded by the filter body. The support body is made of an elastomer and is able to yield in a radial inward direction to compensate volume expansion when the fluid freezes.

5 Claims, 1 Drawing Sheet

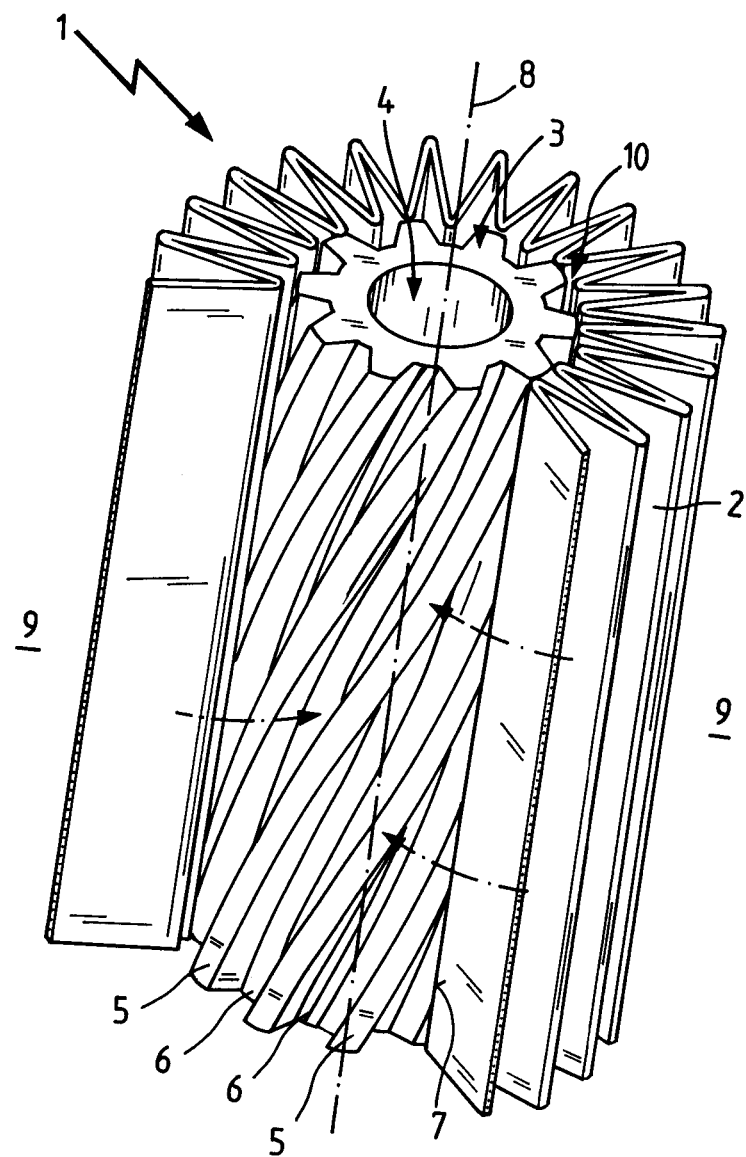

FILTER ELEMENT AND SUPPORT BODY FOR SUCH A FILTER ELEMENT

CROSS REFERENCE TO RELATED APPLICATIONS

The present application is a continuation of U.S. Ser. No. 12/725,729 filed Mar. 17, 2010, and claims the benefit under 35 USC 119 of foreign application DE 20 2009 003 704.5 filed in Germany on Mar. 18, 2009, and which is hereby incorporated by reference in its entirety.

TECHNICAL FIELD

The invention relates to a filter element for purifying a fluid at risk of freezing, the filter element having an annular filter body and a support body surrounded by the filter body.

BACKGROUND OF THE INVENTION

The invention is related to a filter element for purifying a fluid at risk of freezing. The increasingly more stringent legal exhaust gas limits can be fulfilled by commercial vehicles according to the present state of the art only with the addition of special exhaust gas aftertreatment systems. SCR (selective catalytic reduction) catalysts are considered the most promising exhaust gas cleaning system at present; they greatly reduce the proportion of nitrous oxides of the exhaust gas.

For this purpose, by means of an injection valve provided in the exhaust gas system a 32.5% urea-water solution that is carried onboard the vehicle is metered into the exhaust gas. In the catalyst the urea is converted to ammonia so that the nitrous oxides contained in the exhaust gas are converted to harmless nitrogen and water.

In this technology, the injection nozzles for the urea-water solution as well as the other system components must be protected from wear by means of a filter. In this way, the service life of the metering unit is extended. The filter element is installed either on the pressure side or the suction side of the pump that pumps the urea solution from the storage container.

The freezing point of the aforementioned urea-water solution, without any flow-improving additives, is at −11 degrees Celsius. Accordingly, it cannot be excluded that the solution will freeze under certain climatic environmental conditions, in particular when the vehicle is parked. Since the solution will expand upon freezing, measures must be taken to prevent damage of the system components carrying the solution as a result of such expansion. The same problem also occurs for other fluids that are at risk of freezing and systems carrying such fluids.

EP 1 593 419 B1 discloses a liquid filter for fluids at risk of freezing whose filter body is of a closed ring shape and surrounds an annular chamber. In the annular chamber a support element is arranged which is slightly smaller than the annular chamber so that between the filter medium and the support element a minimal gap is present. The support element is largely impermeable for the fluid to be cleaned so that the volume that is taken up by the support element cannot be filled by the fluid. The minimal quantity of the fluid cannot cause a great volume expansion so that damage of the filter parts is thus prevented.

However, the fluid quantity contained in the annular chamber still has an existing expansion potential not to be neglected that acts onto the components of the filter and stresses them.

SUMMARY OF THE INVENTION

It is therefore an object of the present invention to further develop a filter element of the aforementioned kind in such a way that its operational safety at low temperatures is improved.

In accordance with the present invention, this is achieved by a filter element that has a support body comprised of an elastomer.

The invention has furthermore the object to provide a support body for such a filter element that will reduce the stress on the filter body supported by the support body.

In accordance with the present invention this is achieved in that the support body for the filter element is made of an elastomer.

The present invention proposes a filter element for purifying a fluid at risk of freezing which comprises an annular filter body and a support body surrounded by the filter body wherein the support body is comprised of elastomer, in particular of EPDM (ethylene propylene diene rubber). The stiffness of the elastomer support body is sufficient in order to support the filter body with regard to a flow-induced pressure differential acting radially from the exterior to the interior of the filter body. On the other hand, the elastic property of the elastomer has the effect that the support body may yield, compress or deform under pressure. The yielding action is sufficient in order to compensate volume increase upon freezing of the fluid so that damage or even destruction of the filter element or of the filter body can be prevented. Moreover, the support body acts as a displacement body so that the fluid quantity that is present at the clean side of the filter body is reduced. This contributes to reduction of the total expansion and thus to reduction of the load acting on the components.

In a preferred embodiment of the invention, the support body has a cavity and the interior of the cavity is not in communication with the fluid to be purified. The cavity may be filled, for example, with gas, in particular with air. Whatever the contents of the cavity, the contents of the cavity are compressible so as to further permit radially inwards compression of the support body. The compressible contents in the cavity increase the yielding action of the support body under radially acting pressure load, such as the fluid forces induced by the volumetric expansion of freezing components of the fluid. In this way, the capability for volume compensation is improved.

In a preferred embodiment, the support body has on its exterior side support ribs with intermediately positioned fluid passages wherein the filter body is supported on the support ribs. This makes it possible to form the support body as a large-volume displacement body that still can discharge the filtered fluid on the clean side of the filter body with minimal flow resistance.

Advantageously, the filter body is embodied as a star-shaped folded filter bellows; the support ribs and the fluid passages on the support body are arranged in a coil-shape or screw-shape. The axis-parallel extending folds or their edges are thus positioned always on one or several coil-shaped support ribs without there being the risk that they are pressed into one of the fluid passages.

BRIEF DESCRIPTION OF THE DRAWINGS

The accompanying FIGURE, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawing.

The FIGURE shows in a perspective view one embodiment of the filter element, consistent with the present invention.

Skilled artisans will appreciate that elements in the drawing FIGURE are illustrated for simplicity and clarity and have not necessarily been drawn to scale. For example, the dimensions of some of the elements may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter element for purifying a fluid at risk of freezing. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

The FIGURE shows in a perspective partially sectioned illustration a filter element 1 according to the invention for purifying a fluid at risk of freezing; in the illustrated embodiment the filter element 1 is embodied for filtration of a urea-water solution for exhaust gas aftertreatment in a commercial vehicle. The filter element 1 is however also suitable for purifying or filtering other fluids that are at risk of freezing, in particular in motor vehicles.

The filter element 1 is substantially of rotational symmetry relative to a longitudinal axis 8 and comprises an annular approximately cylindrical filter body 2 as well as a support body 3 that is also approximately cylindrical and that is surrounded by the filter body 2. The filter body 2 and the support body 3 extend coaxially to the longitudinal axis 8. However, embodiments with a deviating contour, for example, one that has no rotational symmetry, may be expedient also.

The filter body 2 in the illustrated embodiment is a star-shaped folded bellows whose folds extend with their inner edges 7 axis-parallel to the longitudinal axis 8.

The radially inwardly positioned support body 3 has support ribs 5 on its radial exterior side with intermediately positioned fluid passages 6. The support ribs 5 and the fluid passages 6 extend in a coil shape on the exterior side of the support body 3. The filter body 2 is supported with its inner edges 7 in the radial direction from the exterior to the interior on the exterior surfaces of the support ribs 5.

In operation, the raw side 9 of the filter element 1 is positioned radially outside of the filter body 2 while radially inwardly thereof the clean side 10 is positioned. The filter body 2 is therefore flowed through by the fluid to be purified radially from the exterior to the interior (see dash-dotted arrows). The resulting flow resistance generates a pressure differential that forces the filter body 2 radially from the exterior to the interior against the support body 3. The support body 3 displaces on the clean side 10 of the filter body 2 the predominant portion, i.e., more than 50%, of the fluid volume at the clean side. Since it is otherwise impermeable for the fluid, the filtered fluid flows out through the fluid passages 6. The fluid volume at the clean side is limited in the illustrated embodiment to the volume between the inner folds of the filter body 2 and to the volume of the fluid passages 6. In this way, the quantity of the fluid present at the clean side is minimized so that its expansion upon freezing will exert only minimal loads onto the filter body 2 and the support body 3.

The support body 3 according to the invention is comprised of an elastomer. Advantageous with respect to the selection of the elastomer material is EPDM (ethylene propylene diene rubber). Moreover, the support body 3 is embodied especially as an enclosed cavity with an interior 4. The interior 4 does not communicate with the fluid to be purified and is also not filled in any other way by an incompressible medium. Instead, the interior 4 contains a gas such as air or the like and is therefore compressible. By making the support body 3 from an elastomer, enhanced by the hollow interior 4, a distinctive radial yielding action of the support body 3 with regard to radial pressure loads acting from the exterior to the interior is provided. When a volume enlargement caused by freezing of the fluid contained between the support body 3 and the filter body 2 is generated, the support body 3 can yield radially inwardly and therefore compensate the volume increase. The elastic yielding action avoids any damage of the support body 3. Moreover, it relieves the filter body 2 so that the filter body 2 is also not overloaded by the volume increase.

The support body 3 can be produced by injection molding. The illustrated geometric configuration and also comparable other geometric configurations enable moreover a manufacture of an endless (continuous) extrusion part that is then cut to size.

In the foregoing specification, specific embodiments of the present invention have been described. However, one of ordinary skill in the art appreciates that various modifications and changes can be made without departing from the scope of the present invention as set forth in the claims below. Accordingly, the specification and FIGURES are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims The invention is defined solely by the appended claims including any amendments made during the pendency of this application and all equivalents of those claims as issued.

The invention claimed is:
1. A filter element for purifying a fluid at risk of freezing, the filter element, comprising:
- an elongated annular filter body is a star-shaped filter bellows of filter media having a plurality of axially aligned folds, the filter media separating an unfiltered fluid side from a filtered fluid side;
- an elongated support body received within an interior of said annular filter body, said support body having walls of an elastomeric material defining and enclosing an axially extending compressible cavity within;
- wherein said filter body circumferentially surrounds said support body;
- wherein radially inner edges of said folds of said filter media are resting against and contacting onto radially exterior surfaces of said support body;
- wherein said fluid includes fluid components that expand in volume upon freezing, said freezing fluid applying a radial pressure load acting on said support body from an exterior to an interior of said support body; and
- wherein said cavity of said support body is not a passage for fluid flow entering or exiting the filter element;
- wherein support body walls surrounding the cavity are impermeable to fluid flow;
- wherein said support body radially inwardly compresses said cavity and elastically yields under said radial pressure load induced on said support body by said freezing expansion of said fluid volume.

2. The filter element according to claim 1, wherein said elastomer is EPDM.

3. The filter element according to claim 1, wherein
- said support body has an exterior side facing the radially inner side of said annular filter body, said exterior side provided with radially extending support ribs;
- wherein said support ribs define fluid passages therebetween; and
- wherein said filter body is resting against and contacting onto said support ribs.

4. The filter element according to claim 3, wherein
- said filter body is a star-shaped filter bellows including a plurality of axially aligned folds, said folds having radially inner edges resting against and contacting onto said support ribs;
- wherein said support ribs and said fluid passages are arranged in a screw shape on said exterior side of said support body;
- wherein each radial inner edge of said filter body contacts onto a plurality of said support ribs.

5. The filter element according to claim 4, wherein
said fluid passages defined between said ribs are in immediate fluid communication with fluid passages formed between said folds at a radially interior surface of said filter body, combined fluid passages comprising the clean fluid side of the filter element.

* * * * *